(12) United States Patent
Cohen et al.

(10) Patent No.: US 6,700,971 B1
(45) Date of Patent: Mar. 2, 2004

(54) ARRANGEMENT FOR USING DYNAMIC METRICS TO MONITOR CONTACT CENTER PERFORMANCE

(75) Inventors: Richard Alan Cohen, Wayland, MA (US); William Edward Gourlay, Santa Ana, CA (US); Marcus Knotts, Parker, CO (US); Gokul Chander Prabhakar, Somerset, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 443 days.

(21) Appl. No.: 09/723,114

(22) Filed: Nov. 27, 2000

(51) Int. Cl.$^7$ ................................................. H04M 5/00
(52) U.S. Cl. ............................ 379/265.06; 379/265.08; 379/265.05
(58) Field of Search ..................... 379/266.08, 265.06, 379/265.1

(56) References Cited

U.S. PATENT DOCUMENTS

| | | | | |
|---|---|---|---|---|
| 4,737,983 A | * | 4/1988 | Frauenthal et al. | 379/266.08 |
| 5,164,983 A | | 11/1992 | Brown et al. | 379/265.03 |
| 5,483,590 A | | 1/1996 | Chiu et al. | 379/269 |
| 5,577,112 A | | 11/1996 | Cambray et al. | 379/216.03 |
| 5,890,137 A | | 3/1999 | Koreeda | 705/26 |
| 5,945,990 A | | 8/1999 | Morrison et al. | 345/748 |
| 6,014,638 A | | 1/2000 | Burge et al. | 705/27 |
| 6,181,776 B1 | | 1/2001 | Crossley et al. | 379/32.01 |

FOREIGN PATENT DOCUMENTS

| | | | | |
|---|---|---|---|---|
| WO | 99/17522 | 4/1999 | | H04M/3/50 |

* cited by examiner

Primary Examiner—Ahmad F. Matar
Assistant Examiner—Karen Le
(74) Attorney, Agent, or Firm—David Volejnicek

(57) ABSTRACT

An arrangement (100) for monitoring contact-center (104–108) performance automates the monitoring process by using a database schema (250–270) that records (200–224) the contact center to be monitored, its skills, the locations where the skills are located (in the case of a distributed contact center), the objective or target value for a given skill attribute (such as average speed of answer, maximum delay, etc.), the acceptable deviation from the objective (tolerance), the maximum acceptable deviation between locations (in the case of a distributed contact center), the periodicity or frequency of the monitoring, and the comparison operator needed to determine how a given observed or actual value for the skill attribute is to be compared with its specified objective and tolerance. Monitoring is then effected (300–366) as follows. Periodically, the contact center is automatically polled for performance data, actual values of the skill attributes are computed therefrom, and the actual values, the objective values, and the tolerances are used in a meta formula to determine the performance metrics. When skills are distributed across several locations of a distributed contact center, the arrangement determines the performance metrics for each location, and further determines whether the maximum deviation between the locations of their actual values exceeds the maximum acceptable deviation. Results indicating performance outages are sent to a party that is responsible for the contact center.

12 Claims, 4 Drawing Sheets

ARRANGEMENT FOR USING DYNAMIC METRICS TO MONITOR CONTACT CENTER PERFORMANCE

TECHNICAL FIELD

This invention relates generally to contact centers, also variously referred to as call centers, automatic call distribution systems, and telemarketing systems, and relates specifically to performance-monitoring of such centers.

BACKGROUND OF THE INVENTION

Monitoring the performance of a contact center is an important aspect of managing its operation. Such monitoring has to be periodic but reconfigurable, and should also take into account the dynamics that determine the performance of the contact center, such as the changing nature of its attributes and performance expectations.

The performance of a contact center is a measure of how well the contact center staff who are assigned to a selected set of skills are doing, as measured by a set of metrics. For example, one may want to monitor whether "sales" agents have an "average speed of answer" that is consistently less than ten seconds. However, the dynamics of contact centers demand that such metrics automatically reflect the changing needs of the contact center. For instance, in the above example, one may want to change the monitoring criteria over time to "average speed of answer" between 8 and 15 seconds. An arrangement for monitoring the performance of a contact center should accommodate such changing metrics over time. In addition, the arrangement should be universally applicable: that is, it should not be contact center- or customer-specific, in order to accommodate monitoring of a plurality of contact centers each with its own performance measurements. Consequently, the determination of a metric for a given contact center should be done at run-time, right before that contact center is monitored. Moreover, many contact centers are distributed: that is, agents for a given skill can be located at geographically distributed locations. Thus, the arrangement should not only assess a given contact center's performance, but it should also compare performance across the contact center's locations to determine whether all of them are performing consistently. The above issues are further complicated by the fact that contact centers, whether centralized or distributed, can be driven by more than one switch (ACD), that skill-mapping attributes can vary across different locations of distributed contact centers, and that time zones can vary between different locations of distributed contact centers. These facts need to be taken into account during monitoring.

Existing contact-center monitoring arrangements tend to have a narrow focus and tend to concentrate either on call routing or on monitoring a limited set of attributes while the contact center is operational. Examples of the limited monitoring done by conventional arrangements include picking a random interval and agent to determine his or her performance, or monitoring activities such as keyboard or pointer inputs of agents to obtain context-sensitive information regarding their productivity, or monitoring the customer that the agent is interacting with.

SUMMARY OF THE INVENTION

This invention is directed to meeting these and other needs and solving these and other problems of the prior art. Illustratively, a method of monitoring contact-center performance automates the monitoring process by using a database schema that records the contact center to be monitored, its skills, the locations where the skills are located (in the case of a distributed contact center), the objective or target value for a given skill attribute (such as average speed of answer, maximum delay, etc.), the acceptable deviation from the objective (tolerance), the periodicity or frequency of the monitoring, and the comparison operator needed to determine how a given observed or actual value of the skill attribute is to be compared with its specified objective and tolerance. The performance metric determination is thus dynamic: that is, performance is determined "on the fly" at run time at the time that the contact center is polled for performance-indicative data, and there is no a-priori fixed formula of how to compare an observed skill-attribute value with its specified objective and tolerance to determine a metric for a specified contact center. The result of each poll is sent to a party that is responsible for the contact center, such as a requestor who requested the monitoring.

When a skill is distributed across several locations of a distributed contact center, the method also determines the maximum deviation of the actual values of the skill attribute in those locations, in addition to checking whether the actual value of the skill attribute at each location satisfies the performance criteria. The skill attributes for which performance is monitored, the number of skills, and the number of contact center locations over which a skill can be distributed is essentially unlimited: that is, the method can monitor all the skills in a contact center at all locations over which the skills are distributed.

Generally according to the invention, a method of monitoring performance of one or more contact centers comprises the following functions. A skill attribute, an attribute objective, a comparison operator, and a comparison tolerance for one or more skills of each of the contact centers is specified, illustratively by one or more requesters. The requesters also preferably specify a periodicity for repeating the monitoring of the contact centers, which results in the following functions being repeated for a contact center every corresponding period. Performance data for each of the one or more skills are automatically obtained from the one or more contact centers. An actual value of the specified skill attribute is automatically determined from the obtained data for each of the one or more skills of the one or more contact centers. A difference between the actual value and the specified attribute objective is then automatically compared against the specified comparison tolerance using the specified comparison operator, for each of the one or more skills of the one or more contact centers. Finally, each comparison that does not satisfy its comparison operator is automatically reported.

Owing to the complexity of the monitoring criteria, the tasks performed by the method are extremely cumbersome and difficult to "do by hand." This precludes this type of activity from being emulated by a human. More importantly, the method removes chances for erroneous analysis and conclusions about a monitored contact center that can result from manual monitoring by a human. Instead, the method effects the monitoring automatically without human intervention. Also, unlike conventional monitoring schemes, this method is non-obtrusive and may be performed independently of whether the monitored contact center is operating or not at the time that it is polled.

While the invention has been characterized above in terms of method, it also encompasses apparatus that performs the method. The apparatus preferably includes an effector—any entity that effects the corresponding step, unlike a means— for each step. The invention further encompasses any computer-readable medium containing instructions which, when executed in a computer, cause the computer to perform the method steps.

These and other features and advantages of the invention will become evident from the following description of an illustrative embodiment of the invention considered together with the drawing.

DETAILED DESCRIPTION

Figure 1:
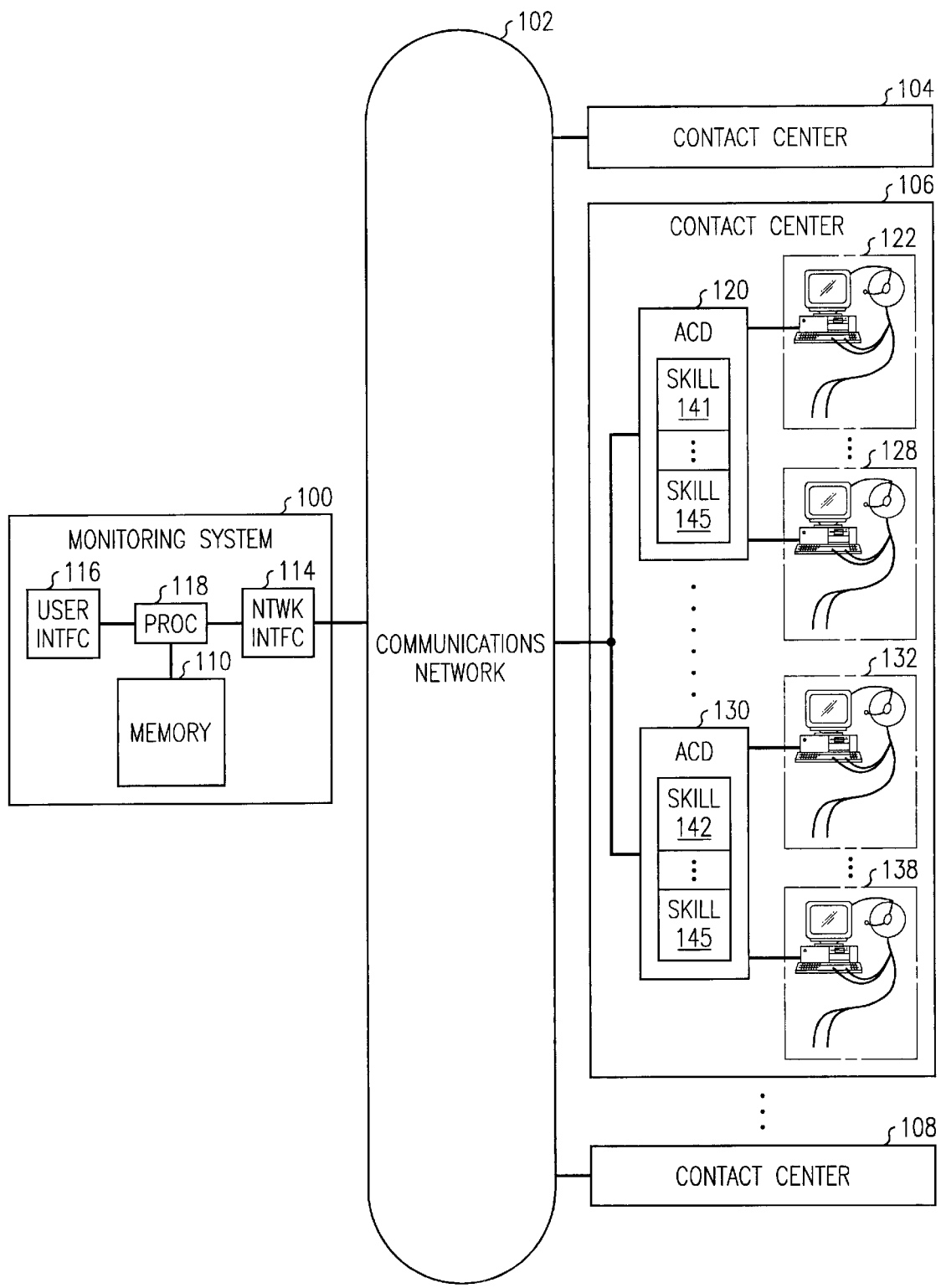
FIG. 1 is a block diagram of a communications system that includes an illustrative embodiment of the invention.

FIG. 1 shows a communications system comprising a communications network 102 and a plurality of customer contact centers 104–108. Communications network 102 is illustratively the public telephone network and/or a data communications network such as the Internet. A plurality of contact centers 104–108 may be serving customers of a single entity (e.g., a business), or each contact center 104–108 may be serving customers of a different entity, or use of one or more contact centers 104–108 may be shared by a plurality of entities. Contact centers 104–108 are illustratively telephone and/or multimedia call centers. Each contact center 104–108 illustratively comprises one or more automatic communications distribution (ACD) systems 120–130 that distributes communications for servicing to a plurality of subtending servers 122–128 and 132–138, respectively, such as call-center agents. Servers 122–128 and 132–138 are usually divided into a plurality of splits or skills 141–145. Each split or skill 141–145 serves a different type of communications; e.g., communications requiring different server expertise for their proper servicing. The components of each contact center 104–108 may be geographically co-located in one location, or geographically distributed among a plurality of locations. As described so far, the system of FIG. 1 is conventional.

The system of FIG. 1 further includes a contact-center monitoring system 100 that is connected to contact centers 104–108 by communications network 102. Monitoring system 100 periodically polls a contact center 104–108 and obtains therefrom 24-hour interval data for a set of specified skills for a selected set of days. System 100 then determines therefrom a value of a key attribute for each skill and compares the difference between the determined, actual, value and an objective, target, value against a tolerance parameter by using a specified operator. All of the above-specified data items are inputs that are subject to change from poll to poll and usually vary between contact centers 104–108. If the skills of a contact center 104–108 are geographically distributed, the deviation of the skill-attribute values across the different locations is monitored and compared against a specified deviation; this is in addition to the metric measurement of whether the skill-attribute actual value is within a specified tolerance of the objective value at each location. When monitoring distributed contact centers, system 100 also makes appropriate time-zone corrections and performs analysis of the contact-center data using a normalized time zone. Contact centers 104–108 of different entities that are to be monitored are independent of each other (that is, no entity-specific specialization is needed for the monitoring). The monitoring also handles single or multiple ACDs of a contact center over which skills are administered.

Monitoring system 100 is a stored-program-controlled system, such as an appropriately programmed general-purpose computer. It includes a memory 110 for storing control programs and data, a processor 118 for executing the stored programs and using the data, an operator interface 116 for interacting with an operator of system 100, and a network interface 114 for accessing and interacting with contact centers 104–108 via communications network 102. Program and data contents of memory 110 that are relevant to understanding the invention are functionally illustrated in FIG. 2 et seq.

Figure 2:
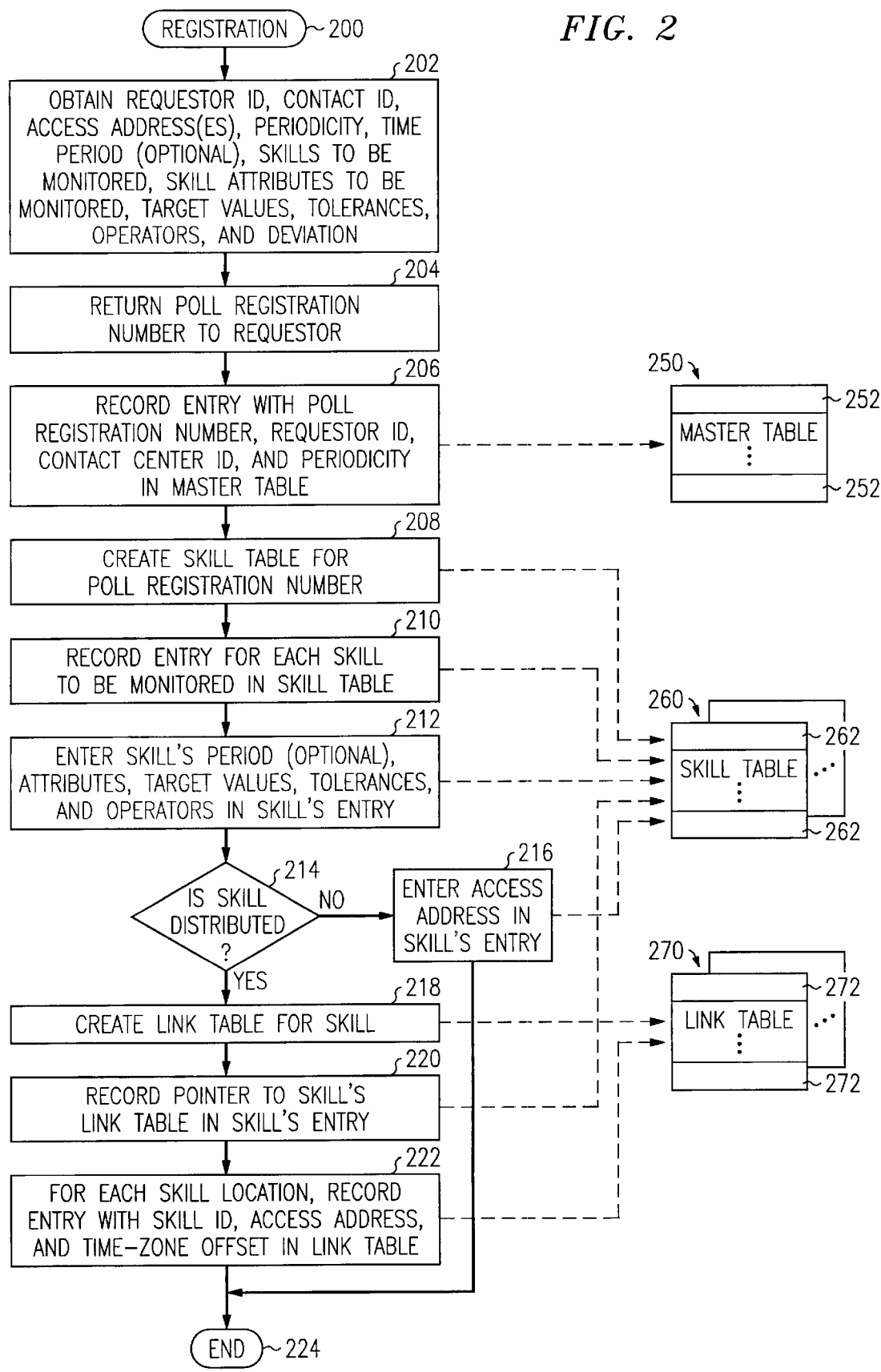
FIG. 2 is a flow diagram of a polling registration function of a monitoring system of the communications system of FIG. 1.

FIG. 2 shows a monitoring registration function and related data structures of monitoring system 100. The monitoring registration function allows a requester to register a contact center 104–108 for monitoring. Upon its invocation, at step 200, the registration function obtains the requestor's ID, the contact center's ID and access address (e.g., port dial-up number) or access addresses in the case of a distributed contact center, the periodicity of the monitoring (e.g., every day, every hour, etc.), the monitoring interval within a day during which monitoring should take place (this is optional; the default is 24 hours), the IDs of the skills that are to be monitored, the skill attributes to be monitored (e.g., call volume, average speed of answer, number of abandoned calls, service level, skill occupancy, maximum delay, and/or percent over threshold), the skill attributes' objective values, tolerances, operators (e.g.,=,>,<) to compute the performance metrics for the skill attributes, and—if the contact center is distributed—the allowable deviation in attribute values between locations, at step 202. Illustratively, the requester fills out an on-line registration form that has fields for all of these data, and submits it electronically to monitoring system 100. After every successful registration, system 100 issues a registration number for the registered monitoring, at step 204; the registration number is useful to the requester for querying about the status of the monitoring as well as for changing it over time.

The function effects the registration as follows. From the requestor's input, it separates the contact center ID, the periodicity of the monitoring, and the ID of the requestor performing the registration, and stores an entry 252 containing this information in a master table 250, at step 206. The registration number serves as a primary key for table 250. The function then creates a separate skill table 260 for the registration number, at step 208, and stores therein one entry 262 for each skill that is to be monitored for the specified contact center, at step 210. In every skill entry 262 it records the skill's ID, the skill's attributes that are to be monitored and their corresponding objectives, tolerances, and comparison operators, and allowable deviations in the case of a distributed contact center, at step 212. If it was provided, the function also records the monitoring interval in each entry 262.

If a skill for a given contact center is not distributed across several locations, as determined at step 214, then the function also stores the contact center access address in entry 262, at step 216. If the skill is distributed across several locations, then the function creates a separate link table 270 for that skill, at step 218, links it to the skill's entry 262 in skill table 260 by storing a pointer to link table 270 in entry 262, at step 220, and for each contact center location creates an entry 272 in link table 270 containing the corresponding skill ID, the location's access address, and a time-zone offset parameter, if any, at step 222. Following step 216 or 222 registration ends, at step 224.

The registration number and the access address (also known as LDN) for a given poll registration are common to master table 250, skill table 250, skill table 260, and link table 270 (if any links are specified) and connect the information in all three tables 250, 260, 270 for a poll registration, making it possible to inter-relate the information stored in these tables by the registration process at the time of polling. It should be noted that maintaining separate entries 262 and 272 for each skill to be monitored and for each location of a skill (respectively) makes system 100 independent of the number of skills and the number of locations over which a skill is distributed. The number of skill entries is limited only by the capacity of the database management system to hold records, which is very large (essentially unlimited for practical purposes). For example, for a contact center C with k skills S1, S2, . . . , Sk, and each skill with a set of up to N links (say Li1, Li2, . . . , LiN are the N links for skill Si), the system will have: one master table record, k skill table records, and at most k*N link table records. For concrete illustration, if k is 20, and N is 4, then there is one master table records, 20 skill table records, and 80 link table records. A practical database system can hold hundreds of thousands of records (if not millions). Thus, storing skills separately from their links provides independence with respect to the way a skill is administered over time (and facilitates easy change in a skill's link over time as needed). Moreover, if skill link data were kept as a part of the skill table, this would result in a lot of database redundancy, since for every link of a skill, one would need to repeat the same information about the skill for every link record of the skill. Keeping a link table also normalizes the schema design for efficient data storage and manipulation, and helps its evolution over time.

Figure 3:
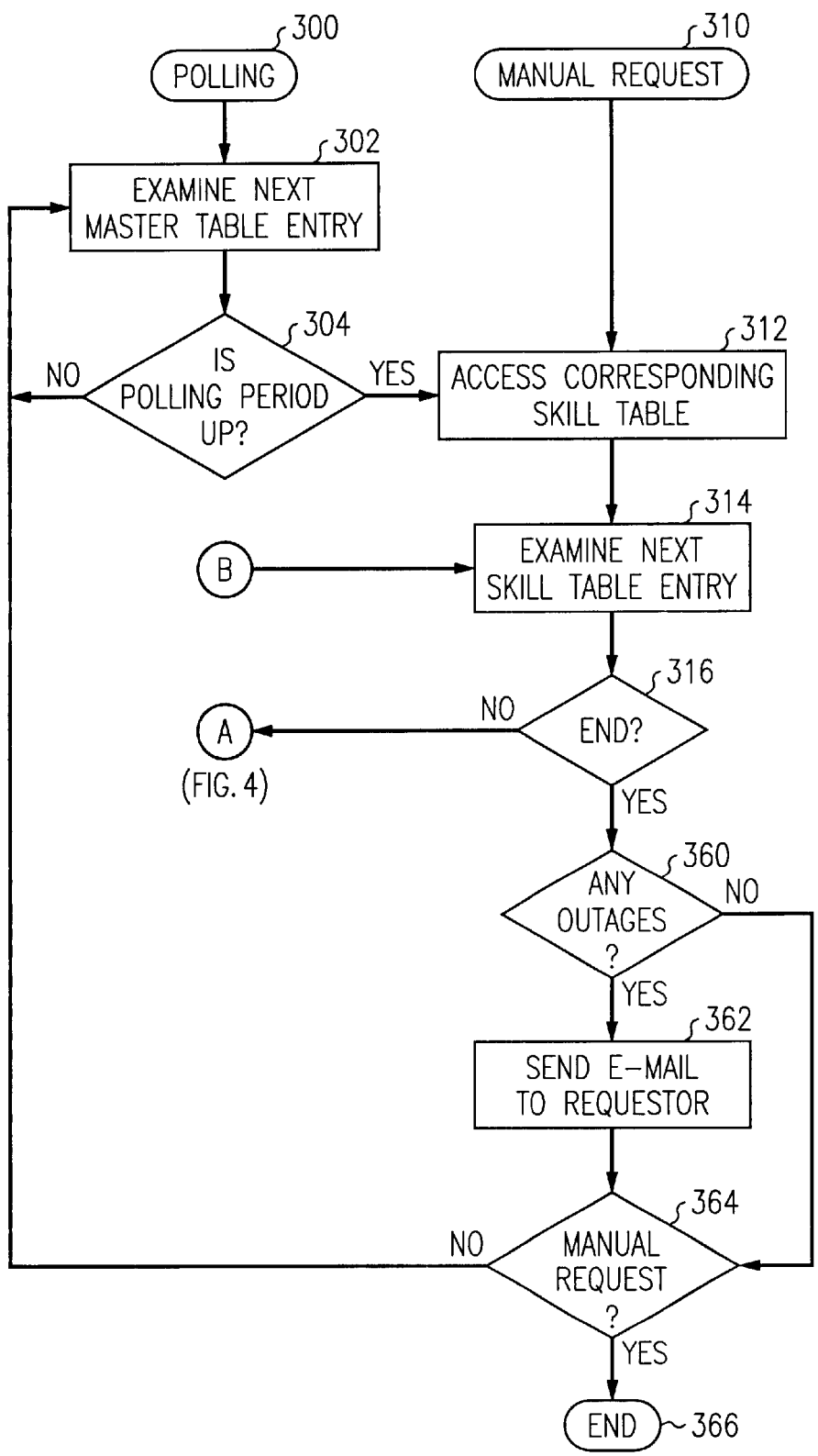
FIGS. 3 and 4 are a flow diagram of a polling function of the monitoring system of the communications system of FIG. 1.
Figure 4:
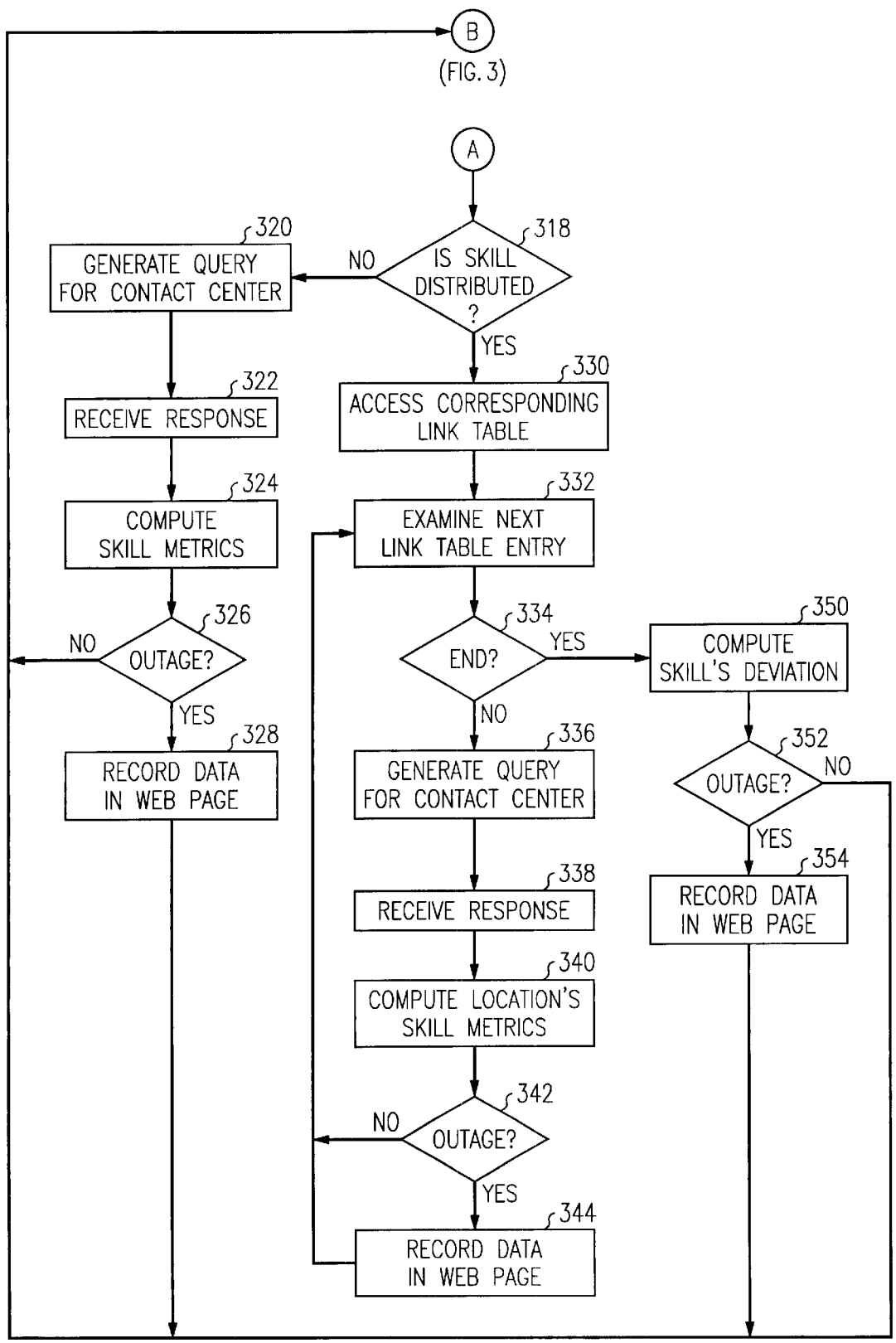

FIG. 3 shows a polling and valuation function, which can be invoked either manually or automatically. In the manual case, a specific contact center is chosen manually by a human, at step 310, while the automatic invocation works in the background, without human intervention, and on a periodic basis polls all contact centers that are registered for monitoring, at step 302–304. When automatic polling is invoked, at step 300, the function begins to examine entries 252 of master table 250 one-by-one, at step 302, to determine if the monitoring periodicity specified in the examined entry 252 indicates that monitoring is due, at step 304. If monitoring is not due yet, the function returns to examine the next entry at step 302; if monitoring is due, the function proceeds to perform the monitoring for that entry 252, at steps 312 et seq. Following step 310 or 304, the function accesses the skill table 260 that corresponds either to the contact center 204–208 whose polling was manually requested at step 310 or to the master table entry 252 that triggered the automatic poll, at step 312, and proceeds to examine the skill table's entries 262 one-by-one, at step 314. The function checks if the examined entry 262 corresponds to a distributed skill, at step 318. If not, the function uses the entry contents to generate and send a query to the target contact center 204–208 for the required data, at step 320. Upon receiving the requested data, at step 322, the function uses the data and contents of entry 262 to compute the actual values of the skill's monitored attributes, at step 324. The computation is effected as follows.

From the data set collected at step 322, first compute the actual value of a skill attribute specified by entry 262. Then compute the performance metric using the following meta formula:

$$\text{METRIC}=\text{abs}(A-O)\text{op}T$$

where "abs" is the absolute value function, A is the actual value, O is the objective or target value, "op" is the comparison operator, and T is the tolerance specified by entry 262. The above formula is described as "meta" because it is only instantiated to a formula at the instant that the skill data are analyzed (hence the term "dynamic metric"). Note that the above performance metric computation for analyzing skill data can vary across different contact centers, and can also vary from poll to poll for a given contact center and monitored skill. As an example, consider the skill attribute "Average Speed of Answer." It is computed using a fixed formula $$\text{Avg Speed of Answer} = \frac{\text{total number of calls serviced}}{\text{total answer time}}$$

The value obtained by the above computation corresponds to A in the above meta formula for computing the performance metric for this attribute. However, note that the performance metric for "Average Speed of Answer" is not predetermined: it is generated "on the fly" at run time when instantiating the above meta formula for METRIC.

If the computations at step 324 return all true values for METRICs, indicating that all desired metrics have been met, as determined at step 326, the function merely returns to steps 314 et seq. to process the next entry 262 of skill table 260. If, however, any computations at step 324 return a false value for METRIC, indicating an outage between objective and actual values, the function records the outage data in a Web page, at step 328, before returning to steps 314 et seq.

Returning to step 318, if it is determined there that the subject skill table 260 entry 262 represents a distributed skill, the function accesses the corresponding link table 270, at step 330, and proceeds to examine its entries 272 one-by-one, at step 332. The function uses the contents of the currently examined entry 272 to generate and send a query to a location of the distributed contact center for the required data, at step 336. Upon receiving the requested data, at step 338, the function uses the data and contents of current entries 262 and 272 to compute the desired metrics, at step 340, in the manner discussed above for step 324. If the computations at step 340 return all true values for METRICs, as determined at step 342, the function merely returns to steps 332 et seq. to process the next entry 272 of link table 270. If, however, any computations at step 340 return a false value for METRIC, the function records the outage data in the Web page, at step 344, before returning to steps 332 et seq.

When the function completes processing all entries 272 of link table 270, as determined at step 334, it proceeds to step 350 to compute the deviation among the actual values of the skill attribute of the plurality of locations. The deviation of the values is computed using the formula:

$$\text{Deviation}=\text{Max}(s)-\text{Min}(s)<=D$$

where Max(s) is the maximum and Min(s) is the minimum actual value of the specified skill attribute of all of the locations among which the skill is distributed and monitored, and D is the maximum allowed deviation specified in the current skill table entry 262. If the computation at step 350 returns a true value for DEVIATION, as determined at step 352, the function merely returns to steps 314 et seq. to process a next skill table entry 262. But if the computation at step 350 return a false value for DEVIATION, the function records the outage data in the Web page mentioned above at step 344, at step 354, before returning to steps 314 et seq.

When the function completes processing all entries 262 of skill table 260, as determined at step 316, it checks whether there have been any outages detected during the processing of skill table 260, at step 360, as evidenced by the presence of outage data. If so, the function sends e-mail to the requestor of the manual request or specified in the current master table entry 252, at step 362. The e-mail electronically alerts the requestor who registered the monitoring and specifies the Web page that he/she should look at to check the results. If no outages were detected, or following step 362, the function checks whether the just-completed processing was a result of a manual request, at step 364. If so, the function ends processing, at step 366; if not, the function returns to step 302 to automatically process a next entry 252 of master table 250.

In performing the above functions, monitoring system 100 uniformly handles the following monitoring scenarios. (This further illustrates the complexity of monitoring system 100.)

- Single-site contact center and single ACD (hence, all skills are administered on this ACD).
- Single-site contact center and multiple ACDs, but monitored skills are in one specified ACD (note that this is identical to the above case except that the contact center architecture is different).
- Single-site contact center and multiple ACDs, and monitored skills are administered across several ACDs.
- Distributed contact center with a single ACD for each site, and skill administration of all sites is identical. (For example, a "sales" skill in this scenario would map to one identical skill ID in all sites.)
- Distributed contact center with a single ACD for each site, but skill administration of all sites is not identical. (For example, the "sales" skill in this scenario need not map to one identical skill ID in all sites.)
- Distributed contact center with multiple ACDs at each site, and skill. administration at different sites is identical with respect to both the ACD on which they are administered and their skill IDs. (For example, in this scenario, a "sales" skill is given an ID "25" on all sites, and is administered on ACD "5" on all the sites that are being monitored.)
- Distributed contact center with multiple ACDs at each site, and skill administration at different sites is identical with respect to the ACD on which they are administered but not with respect to their skill IDs. (For example in this scenario, a "sales" skill is given an ID that is site-specific, but is administered on ACD "5" on all the sites that are being monitored.)
- Distributed contact center with multiple ACDs at each site, and skill administration on different sites is not identical with respect to either the ACD on which they are administered or their skill IDs.

The advantages of monitoring system 100 include its ability to handle autonomy, distributivity, and changing contact-center performance criteria over time (through dynamic metrics, dynamic skill-mapping across sites, and handling of multiple ACDs). More specifically, the unique functional aspects of monitoring system 100 include the following:

- The operator that determines the comparison of an observed attribute value at a contact center with a user-specified tolerance is determined at run time when the contact center is polled. Thus, the computation to determine a given contact center metric need not be static (fixed). For example, for a given contact center C, this week one may be looking for ACD calls above a tolerance limit of 1000, but in the next week one may be looking for ACD calls above 1000 but below 2000 for the same contact center. The determination of how to compare ACD calls with the tolerance is determined at run-time when the contact center C is polled. Moreover, in the most general case, one may be looking for ACD calls above a value in one poll and ACD calls below a value in another poll of the same contact center. Both polls would determine at run time the type of comparison that should be made for ACD calls instantiating the meta formula specified above to monitor and report the outcome accordingly.
- Existing contact centers are often distributed in different geographical locations and thus all these locations need to be monitored in order to assess the overall performance. When contact centers are distributed, a second aspect of the "dynamics" of system 100 arises because a monitored skill in a given distributed contact center is only determined at run-time. For example, company "X" has several geographically-distributed contact centers, and one of the skill attributes that can be typically monitored for this company is "sales". However, in order to monitor "sales" performance, all the contact centers where the "sales" skill is administered need to be polled in order to get a complete assessment. Furthermore, the "sales" skill for company "X" for a Los Angeles site could be administered as "25", whereas it could be administered as "86" in a corresponding Denver site. The mapping of the skills when monitoring these sites is done at run time (that is, the tool obtains information for skill 25 for Los Angeles site, but when monitoring the skill for Denver site, it monitors for 86). This is also essential for the correctness of the technique.
- When monitoring distributed contact centers, the technique moreover compares their performance across sites to determine if there is any deviation in their overall operation from a user-specified deviation. It also automatically accounts for any time-zone correction that is to be effected. For example, in doing the monitoring for the multiple sites of company "X", the poll not only determines whether the monitored metric compares with tolerance for each site (Los Angeles and Denver), but also compares across these two sites for any deviation from accepted norms. Such inter-site monitoring and performance analysis is unique. Also note that the skill in Los Angeles could be administered in ACD 3, whereas the skill in Denver could be administered in ACD 7. Moreover, the polling also accounts for time-zone differences between Denver and Los Angeles and maps the performance data into a normalized time (either Denver time or Los Angeles time, depending on the registration).
- The technique can monitor the performance of different contact centers belonging to different entities (i.e., contact centers that are autonomous and independent of one another) simultaneously. The technique is capable of uniformly monitoring these call centers despite this autonomy (that is, no special handling is required on a per-entity/contact-center basis).
- All polling parameters for a contact center are reconfigurable. If a reconfiguration occurs, then the next earliest scheduled poll automatically handles the new metric measurements for the specified contact center. If the contact center is distributed, the change is automatically applied to all of the contact center locations that are affected by the reconfiguration.

For fine-grained control of the monitoring, the monitoring can be made to run automatically to poll a set of contact centers or can be manually invoked to monitor a specific contact center.

In doing the monitoring using dynamic skill mapping and dynamic metrics for performance analysis, it is also taken into account whether the contact center skills are administered in a single ACD (switch) or multiple ACDs.

Of course, various changes and modifications to the illustrative embodiment described above will be apparent to those skilled in the art. For example, Although described for contact centers that use traditional PSTN, the invention is also applicable to networked call centers, Internet call centers accessible from the web, call centers accessible via wireless, etc. That is, the invention is independent of the individual contact/call center architecture. Also, statistics can be applied to find deviations, similarities, and other metrics of operation across independent contact centers (for example, contact centers belonging to two autonomous organizations). This can be used for competitive analysis, statistical studies, etc. Furthermore, the metric specification can be made more general, where the user can specify an arbitrary computation per metric that can be used in place of the meta formula. This can be accomplished be storing a specification language in place of the operator and using a language interpreter at the time when a contact center is polled (in contrast to instantiating the meta formula). Moreover, the monitoring need not be restricted to skills, but may be used to monitor any desired aspects of contact/call center performance, such as network trunking, agent groups, applications, VDNs, etc. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of monitoring performance of one or more contact centers, comprising:
   (a) specifying a skill attribute, an attribute objective, a comparison operator, and a comparison tolerance for one or more skills of each of the contact centers;
   (b) automatically obtaining performance data for each of the one or more skills from the one or more contact centers;
   (c) automatically determining an actual value of the specified skill attribute from the obtained data for each of the one or more skills of the one or more contact centers;
   (d) automatically comparing a difference between the actual value and the specified attribute objective against the specified comparison tolerance using the specified comparison operator, for each of the one or more skills of the one or more contact centers; and
   (e) automatically reporting each comparing that does not satisfy its comparison operator.

2. The method of claim 1 further comprising:
specifying a periodicity for repeating the monitoring for each of the contact centers; and
repeating steps (b) through (e) for each of the contact centers with the periodicity specified for each said contact center.

3. The method of claim 2 wherein:
specifying comprises
   for each of the contact centers, creating a skill table comprising an entry for each of the one or more skills of the contact center and storing the skill attribute, the attribute objective, the comparison operator, and the comparison tolerance for the skill; and
   for each of the contact centers, creating an entry in a master table storing the periodicity for the contact center and pointing to the skill table of the contact center.

4. The method of claim 1 further comprising:
specifying a monitoring interval for one of the contact centers; and
repeating steps (b) through (e) for the one of the contact centers only during the specified monitoring interval.

5. The method of claim 1 wherein:
specifying further comprises
   specifying a skill attribute deviation and a plurality of locations of a distributed one of the contact centers;
obtaining comprises
   automatically obtaining performance data for each of the one or more skills from each of the plurality of locations of the distributed contact center;
determining comprises
   automatically determining an actual value of the specified skill attribute from the obtained data for each of the one or more skills for each of the plurality of locations of the distributed contact center;
comparing comprises
   automatically comparing a difference between the actual value and the specified attribute objective against the specified comparison tolerance using the specified comparison operator for each of the one or more skills for each of the plurality of locations of the distributed contact center, and
   automatically comparing a difference between a maximum said actual value and a minimum said actual value of the specified skill attribute of the plurality of locations of the distributed contact center against the specified skill attribute deviation; and
reporting further comprises
   automatically reporting each comparison where the difference between the maximum actual value and the minimum actual value exceeds the specified skill attribute deviation.

6. The method of claim 5 wherein
specifying comprises
   for each of the one or more skills of the distributed contact center, creating a link table comprising an entry for each of the locations of the distributed contact center that has the skill and storing an address for the location;
   for each of the contact centers, creating a skill table comprising an entry for each of the one or more skills of said contract center and storing the skill attribute, the attribute objective, the comparison operator, and the comparison tolerance for said skill, and for the distributed contact center further storing the skill attribute deviation and pointing to the corresponding link table for said skill; and
   for each of the contact centers, creating an entry in a master table pointing to the skill table of said contact center.

7. The method of claim 1 further comprising:
manually specifying one of the contact centers; and in response, performing steps (b) through (e) for the one of the contact centers.

8. The method of claim 1 wherein:

reporting further comprises reporting the actual value that was used in each said comparing that does not satisfy its comparison operator.

9. The method of claim 1 wherein:

specifying comprises obtaining the skill attribute, the attribute objective, the comparison operator, and the comparison tolerance for the one or more skills of a contact center from a requester;

returning a registration number to the requester; and storing the registration number in correspondence with the obtained skill attribute, the attribute objective, the comparison operator, and the comparison tolerance for each of the one or more skills of the contact center.

10. A method of monitoring performance of one or more contact centers comprising:

(a) obtaining a contact center address, a time period for repeating monitoring, a skill identifier, a skill attribute, an attribute objective, a comparison operator, and a comparison tolerance, for one or more skills of a contact center from a requestor;

(b) further obtaining addresses of a plurality of locations and a skill attribute deviation for the one or more skills of the contact center from the requester, if the contact center is a distributed contact center;

(c) returning a registration number to the requestor;

(d) for each of the one or more skills, creating a link table comprising an entry for each of the locations that has the skill, each entry storing the address of corresponding said location, if the contact center is the distributed contact center;

(e) creating a skill table for the contact center comprising an entry for each of the one or more skills, each entry storing the attribute objective, the comparison operator, and the comparison tolerance for said skill, and further storing the skill attribute deviation and pointing to the link table for the skill if the contact center is the distributed contact center;

(f) creating an entry in a master table, pointing to the skill table of the contact center and storing the registration number, the contact center address, and the period for repeating the monitoring;

(g) repeating steps (h) through (m) upon each passing of the period for repeating the monitoring;

(h) automatically obtaining performance data for each of the one or more skills from the contact center by using the address stored in the master table entry, and from each of the locations by using the addresses stored in the link table entries if the contact center is the distributed contact center;

(i) automatically determining an actual value of the skill attribute specified in each skill's skill table entry from the obtained data for each of the skills, and for each of the locations if the contact center is the distributed contact center;

(j) automatically comparing a difference between the actual value of each skill's attribute and the attribute objective specified by the skill's skill table entry against the comparison tolerance specified by the skill's skill table entry using the comparison operator specified by the skill's skill table entry for each of the skills, and for each of the locations if the contact center is the distributed contact center;

(k) automatically comparing a difference between a maximum said actual value and a minimum said actual value of the specified skill's attribute of the plurality of locations against the specified skill attribute deviation specified by the skill's skill table entry, if the contact center is the distributed contact center;

(l) automatically reporting to the requestor each comparing that does not satisfy its comparison operator and the actual value that was used in said each comparing; and (m) automatically reporting to the requestor each comparison where the difference between the maximum actual value and the minimum actual value exceeds the skill attribute deviation specified by the skill's skill table entry and the actual values that were used in said each comparison, if the contact center is the distributed contact center.

11. An apparatus that performs the method of any one of claims 1–10.

12. A computer-readable medium containing instructions which, when executed in a computer, cause the computer to perform the method of any one of claims 1–10.

* * * * *